United States Patent
Caretti et al.

(10) Patent No.: US 10,349,421 B2
(45) Date of Patent: Jul. 9, 2019

(54) RESOURCE ALLOCATION SYSTEM AND METHOD ADAPTED TO IMPLEMENT DEVICE-TO-DEVICE COMMUNICATIONS IN WIRELESS COMMUNICATION NETWORKS

(71) Applicant: TELECOM ITALIA S.p.A., Milan (IT)

(72) Inventors: Marco Caretti, Turin (IT); Giovanni Nardini, Pisa (IT); Andrea Rossali, Cascina (IT); Dario Sabella, Turin (IT); Giovanni Stea, Pisa (IT); Antonio Virdis, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 25 days.

(21) Appl. No.: 15/307,971

(22) PCT Filed: May 8, 2014

(86) PCT No.: PCT/EP2014/059490
§ 371 (c)(1),
(2) Date: Oct. 31, 2016

(87) PCT Pub. No.: WO2015/169380
PCT Pub. Date: Nov. 12, 2015

(65) Prior Publication Data
US 2017/0055270 A1    Feb. 23, 2017

(51) Int. Cl.
*H04W 72/08* (2009.01)
*H04W 72/12* (2009.01)
*H04W 92/18* (2009.01)

(52) U.S. Cl.
CPC ......... *H04W 72/082* (2013.01); *H04W 72/12* (2013.01); *H04W 92/18* (2013.01)

(58) Field of Classification Search
CPC ........................... H04W 72/082; H04W 92/18
See application file for complete search history.

(56) References Cited

U.S. PATENT DOCUMENTS

| | | | | |
|---|---|---|---|---|
| 8,411,584 B1* | 4/2013 | Ding | ...................... | G06F 15/16 370/252 |
| 8,660,550 B2* | 2/2014 | Jung | ................. | H04M 1/72516 455/421 |

(Continued)

FOREIGN PATENT DOCUMENTS

WO    WO 2013/048296 A1    4/2013

OTHER PUBLICATIONS

International Search Report dated Jan. 29, 2015 in PCT/EP2014/059490.

(Continued)

*Primary Examiner* — Rasheed Gidado
(74) *Attorney, Agent, or Firm* — Oblon, McClelland, Maier & Neustadt, L.L.P.

(57) ABSTRACT

A method for allocating communication resources for communications performed by user equipment in a mobile communication network comprises receiving a first indication about an amount of available communication resources and obtaining information about interfering communications between user equipment. The method further comprises, for each communication between user equipment to which communication resources have to be allocated, receiving a second indication about an available communication rate for an infrastructure-based communication and for a device-to-device communication, receiving a third indication about a requested communication rate for said each communication, making a selection between an infrastructure-based communication type or a device-to-device communication type based on the first, second and third indications and the information about interfering communications, and allocating communication resources to each communication on the basis of the selection between an infrastructure-based communication type or a device-to-device communication type.

16 Claims, 6 Drawing Sheets

(56) References Cited

U.S. PATENT DOCUMENTS

| | | | |
|---|---|---|---|
| 9,125,219 B2* | 9/2015 | Hong | H04W 72/085 |
| 9,503,951 B2* | 11/2016 | Lei | H04W 76/14 |
| 2009/0011770 A1* | 1/2009 | Jung | H04L 5/0037 |
| | | | 455/452.1 |
| 2010/0261469 A1* | 10/2010 | Ribeiro | H04W 99/00 |
| | | | 455/423 |
| 2014/0256334 A1 | 9/2014 | Kazmi et al. | |
| 2015/0201426 A1* | 7/2015 | Yi | H04W 72/10 |
| | | | 370/336 |
| 2015/0257160 A1* | 9/2015 | Ishida | H04W 72/0486 |
| | | | 455/452.1 |
| 2016/0198508 A1* | 7/2016 | Lee | H04W 76/023 |
| | | | 370/329 |

OTHER PUBLICATIONS

Rongqing Zhang et al., "Interference-Aware Graph Based Resource Sharing for Device-to-Device Communications Underlaying Cellular Networks" 2013 IEEE Wireless Communications and Networking Conference (WCNC), XP055161191, Apr. 1, 2013, pp. 140-145.

Si Wen, et al., "QoS-Aware Mode Selection and Resource Allocation Scheme for Device-to-Device (D2D) Communication in Cellular Networks" IEEE International Conference on Communications Workshops 2013 (ICC), XP032518499, Jun. 9, 2013, pp. 101-105.

Cheng-Pang Chien, et al., "Exploiting Spatial Reuse Gain Through Joint Mode Selection and Resource Allocation for Underlay Device-to-Device Communications" Wireless Personal Multimedia Communications (WPMC), IEEE, XP032294400, Sep. 24, 2012, pp. 80-84.

Junyi Feng, et al., "Centralized Scheduling of In-band Device-to-Device Communication Underlaying Cellular Networks" 2013 16$^{th}$ International Symposium on Wireless Personal Multimedia Communications (WPMC), XP032493933, Jun. 24, 2013, 5 Pages.

Klaus Doppler, et al., "Mode Selection for Device-To-Device Communication Underlaying an LTE-Advanced Network" Wireless Communications and Networking Conference (WCNC), IEEE, XP031706277, Apr. 18, 2010, 6 Pages.

Mohammad Zulhasnine, et al., "Efficient Resource Allocation for Device-to-Device Communication Underlaying LTE Network" 2010 IEEE 6$^{th}$ International Conferences on Wireless and Mobile Computing, Networking and Communications (WIMOB), XP031807946, Oct. 11, 2010, pp. 368-375.

* cited by examiner

RESOURCE ALLOCATION SYSTEM AND METHOD ADAPTED TO IMPLEMENT DEVICE-TO-DEVICE COMMUNICATIONS IN WIRELESS COMMUNICATION NETWORKS

BACKGROUND OF THE INVENTION

Field of the Invention

The present invention refers to communication systems. More particularly, the present invention relates to the field of wireless or mobile telecommunication networks. Even more particularly, the present invention relates to a resource allocation system and method adapted to implement Device-to-Device communications in wireless communication networks.

Overview of the Related Art

Generally, in a mobile (cellular) telecommunication network, communications among mobile communication devices (e.g., mobile telephones, smartphones and tablets)—generally referred to as User Equipment, or UE in brief—pass through the telecommunication network: two UE, connected to respective "serving" radio transceivers of the network (e.g., radio transceivers of a same or different eNodeB—evolved Node B—in the 3GPP Long Term Evolution (LTE)/LTE Advanced (LTE-A) systems), communicate with each other by means of physical communication channel(s) that are set-up and terminated between the radio transceivers and the UE.

As an alternative to such traditional "2-hop" communication, which hereinafter will be also referred to as "infrastructure-based", or INFRA, communication, recently UE have been made available that are also capable of communicating directly among them when they happen to be within a relatively short range.

This direct radio communication among UE is commonly referred to as "Device-to-Device", or D2D, communication and is based on D2D communication links directly established by two (or more) UE. D2D communication differs from the traditional INFRA communication in that the information is exchanged through physical communication channels that are set-up and terminated between the UE directly, without passing through the network.

The D2D communication links between UE communicating directly among them are generally established over frequencies comprised in a communication frequency range used in the INFRA communications. Thus, non-negligible interference may be experienced by UE performing INFRA communications in the proximities of UEs performing D2D communications and, particularly, when the UEs perform communications over the same and/or neighboring frequencies used for D2D communications, and, vice-versa UEs performing D2D communications may experience interference due to nearby UEs performing INFRA communications over the same or neighboring frequencies. This mutual interference experienced by UE performing INFRA communications and UE performing D2D communications causes an overall degradation of both the INFRA and D2D communications.

Therefore, communication (radio) resources, such as physical resource elements comprised in Physical Resource Blocks—PRBs or RBs—in the LTE/LTE-A systems, have to be carefully allocated among UEs performing INFRA communication and D2D communication in order to achieve satisfying network operation performance (e.g., in terms of Quality of Service or QoS, network capacity, energy efficiency, throughput, etc.).

In the art some expedients for the selection between INFRA or D2D communications and the communication resources allocation thereof have been proposed.

For example, Doppler, Yu, Ribeiro, Janis, "Mode selection for Device-to-Device Communication underlaying an LTE-Advanced Network", Wireless Communications and Networking Conference (WCNC), 2010 IEEE, 18-21 Apr. 2010, discloses a mode selection scheme for selecting between INFRA or D2D communications according to respective achievable throughputs.

Chien, Chen, Hsieh, "Exploiting Spatial Reuse Gain through Joint Mode Selection and Resource Allocation for Underlay Device-to-Device Communications" 15th International Symposium on Wireless Personal Multimedia Communications (WPMC), 24-27 Sep. 2012, discloses both a mode selection and a communication resources allocation scheme.

Mohammad Zulhasnine, Changcheng Huang, Anand Srinivasan, "Efficient Resource Allocation for Device-to-Device Communication Underlaying LTE Network", 6th International Conference on Wireless and Mobile Computing, Networking and Communications (WiMob), 11-13 Oct. 2010 discloses a Mixed Integer Non linear Program (MINLP) for resource allocation and a greedy heuristics for solve the problem at a Transmission Time Interval, or TTI, timescale.

Zhang, Cheng, Yang, Jiao, "Interference-Aware Graph Based Resource Sharing for Device-to-Device Communications Underlaying Cellular Networks", Wireless Communications and Networking Conference (WCNC), 2013 IEEE, 7-10 Apr. 2013 discloses an interference-aware graph based resource sharing algorithm form allocating resources to INFRA and D2D communications in the coverage area of a single cell.

WO 2013/008167 discloses methods, apparatus and computer program products that facilitate scheduling in a hybrid communication network with varying types of devices, such as D2D mobile terminals and other, such as cellular, mobile terminals. In this regard, a D2D scheduling activity factor is calculated by a network node based at least in part on a total number of both D2D mobile terminals and other mobile terminals, and the scheduling activity factor is sent to at least one D2D mobile terminal. The D2D mobile terminal uses the scheduling activity factor to determine when to transmit locally measured signal to interference plus noise ratio (SINR) information to a network node. The D2D mobile terminal may be scheduled by the network node separately from other mobile terminals based at least in part on the SNR information.

US 2013/0322413 discloses a method for the use in a first Wireless Transmit/Receive Unit (WTRU) including transmitting a request for D2D communication resources to an enhanced Node B. The first WTRU may receive an allocation of resources for multiple TTI to be used for D2D communications from the enhanced Node B. The first WTRU may schedule D2D communications with a second WTRU to be performed during the allocated resources. The first WTRU may perform D2D communications with the second WTRU using half duplex communications during the allocated resources.

US 2010/0261469 discloses a method that comprises measuring a first link quality of a first link based at least in part on a first power value; measuring a second link quality of a second link based at least in part on a second power value; and determining a suitable D2D mode for a D2D connection based at least in part on the first link quality, the second link quality, and one or more D2D UE constraints.

Wen, Zhu, Wang, "QoS-Aware mode selection and resource allocation scheme for device-to-device (D2D) communication in cellular networks", IEEE International Conference on Communications Workshops (ICC), 2013 9-13 Jun. 2013, discloses a QoS-Aware mode selection and uplink communication resource allocation.

SUMMARY OF THE INVENTION

The Applicant has found that the known solutions mentioned above fail in providing a satisfactory framework for selecting between D2D and INFRA communications and for allocating the communication resources thereof.

Therefore, the Applicant has coped with the problem of devising a system and method adapted to select between D2D and INFRA communications whichever provides the best communication efficiency (according to one or more communication parameters, such as for example a throughput) for every communicating UE and, at the same time, also adapted to provide an allocation of communication resources in order to obtain best network operation performance according to available communication resources (avoiding interferences among UE regardless of whether they are communicating through INFRA or D2D communication within the mobile communication network).

Particularly, one aspect of the present invention proposes a method for allocating communication resources for communications performed by user equipment in a mobile communication network is proposed. The method comprises the following steps. Receiving a first indication about an amount of available communication resources; obtaining information about interfering communications between user equipment; for each communication between user equipment to which communication resources have to be allocated: receiving a second indication about an available communication rate for an infrastructure-based communication and for a device-to-device communication; receiving a third indication about a requested communication rate for said each communication; making a selection between an infrastructure-based communication type or a device-to-device communication type based on the first, second and third indications and the information about interfering communications, and allocating communication resources to each communication on the basis of the selection between an infrastructure-based communication type or a device-to-device communication type.

Preferred features of the present invention are set forth in the dependent claims.

In one embodiment of the present invention the steps of receiving a first indication about an amount of available communication resources; obtaining information about interfering communications between user equipment; receiving a second indication about an available communication rate for an infrastructure-based communication and for a device-to-device communication; receiving a third indication about a requested communication rate for said each communication, and making a selection between an infrastructure-based communication type or a device-to-device communication, are performed with a periodicity longer than a periodicity at which the step of allocating communication resources to each communication on the basis of the selection is performed.

In one embodiment of the invention, each communication comprises a plurality of data packets and the periodicity of the step of allocating communication resources to each communication on the basis of the selection corresponds to a duration of a transmission in the mobile communication network.

In one embodiment of the invention, said obtaining information about interfering communications is based on information on position and power measurements of the user equipment within the mobile communication network.

In one embodiment of the invention said obtaining information about interfering communications comprises building a conflict graph based on information on position and power measurements of the user equipment within the mobile communication network, the conflict graph indicating interference between couples of communicating user equipment.

In one embodiment of the invention the method further comprises generating a modified conflict graph by modifying the conflict graph on the basis of said selection between an infrastructure-based communication type or a device-to-device communication type.

In one embodiment of the invention, said allocating communication resources is further based on said modified conflict graph.

In one embodiment of the invention, the first indication and the second indication are based on usage metrics of the communication resources regarding ongoing communications.

In one embodiment of the invention, the first indication and the second indication are further based on information about communication resources actually allocated by the step of allocating communication resources.

In one embodiment of the invention, the mobile communication network comprises a plurality of cells which are portions of a coverage area of the mobile communication network, and wherein the method is configured for allocating communication resources for communications performed by user equipment within a selected group of cells.

In one embodiment of the invention, the method further comprises, for each adjacent cells of said selected group of cells, defining an interference region, comprising a portion of each adjacent cell of said group of cells, in which device-to-device communications between user equipment of different cells may experience interferences due to other user equipment within the interference region that perform infrastructure-based communications and viceversa infrastructure-based communications may experience interferences due to device-to-device communications.

In one embodiment of the invention, the method further comprises generating a list of user equipment comprised within the interference region, and indicating communication resources to be allocated to the user equipment of the list in a non-interfering way within the interference region.

Another aspect of the present invention proposes a mobile communication network for managing communication of user equipment. The mobile communication network comprising a coverage area divided into a plurality of cells, each cell being provided with a radio communication station for managing communications of user equipment the cell. The mobile communication network further comprises a communication system configured for implementing the method mentioned above.

In on embodiment of the invention, the communication system comprises at least one link selection module configured for making said selection between an infrastructure-based communication type or a device-to-device communication, and at least one scheduler module configured for performing said allocating communication resources to each communication, the at least one link selection module being coupled with the at least one scheduler module for allocating communication resources according to said selection.

In one embodiment of the invention, at least one link selection module comprises a link selection module configured for making said selection between an infrastructure-based communication type or a device-to-device communication for communications taking place in a selected group of cells of the mobile communication network, and wherein the at least one scheduler module comprises a plurality of scheduler modules each scheduler module being configured for performing said allocating communication resources to each communication in a respective cell of the mobile communication network.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein.

Figure 1:
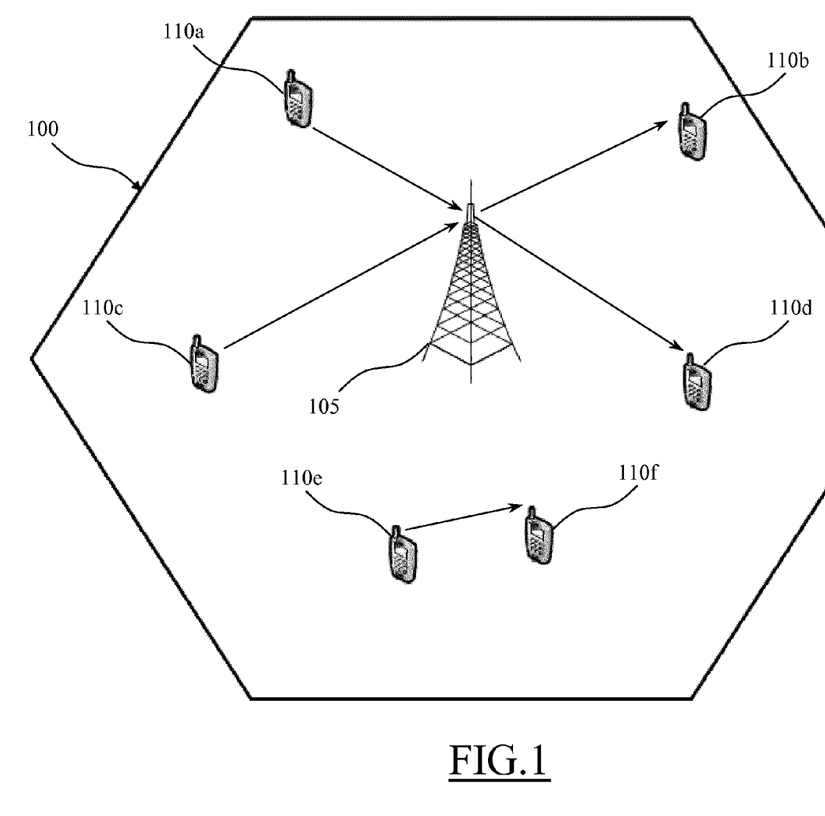
FIG. 1 is a schematic view of a cell of a mobile communication network in which an embodiment of the present invention can be implemented.

With reference to the figures, FIG. 1 is a schematic view of a cell 100 of a mobile communication network in which an embodiment of the present invention can be implemented.

The cell 100 (schematically represented, for the sake of simplicity, by a hexagonal area in FIG. 1) is a portion of a coverage area of the mobile communication network in which one or more radio transceivers (not shown) of a radio communication station, such as an evolved Node B, or eNodeB 105 in 3GPP Long Term Evolution (LTE)/LTE Advanced (LTE-A) systems, manage communications (i.e., transmission and/or reception of information, such as binary data packets) of user equipment or UE (e.g., mobile telephones, smartphones and tablets), such as the six UE 110a, 110b, 110c, 110d, 110e and 110f within the cell 100 in the example of FIG. 1. For example, the eNodeB 105, allocate communication resources, in terms of portions of an available communication transmission band (indicated as physical resource blocks—PRBs or RBs), for the communications of the UE 110a-f.

Several communications may take place at once within the cell 100.

In the example of FIG. 1, UE 110a and UE 110b are assumed to be involved in an "infrastructure-based", or INFRA, communication with respective UE (not shown) outside the cell 100 through the eNodeB 105. The UE 110a transmits information (to be sent to a receiver UE outside the cell 100) to the eNodeB 105 via an uplink channel comprised in a portion of communication resources (uplink resources) generally allocated by the eNodeB 105 for receiving data from the UE 110a, 110b, 110c, 110d, 110e and 110f within the cell 100. Conversely, the UE 110b receives information (sent by a transmitter UE outside the cell 100) from the eNodeB 105 via a downlink channel comprised in a portion of communication resources (downlink resources) generally allocated by the eNodeB 105 for providing data to the UE 110 within the cell 100.

In the example of FIG. 1, the UE 110c and the UE 110d are assumed to be involved in an INFRA communication with one another through the eNodeB 105. The UE 110c transmits information (i.e., in the form of data packets) via an uplink channel to the eNodeB 105, while the UE 110d receives such information (i.e., again in the form of data packets) via a downlink channel from the eNodeB 105.

In the example of FIG. 1, the UE 110e and the UE 110f are assumed to be involved in a Device-to-Device, or D2D, communication (i.e., UE 110e and UE 110f exchange information directly, without having to pass through the eNodeB 105). The UE 110e and the UE 110f may transmit/receive information to/from the other via either an uplink or downlink channel (as described in greater detail in the following).

Figure 2:
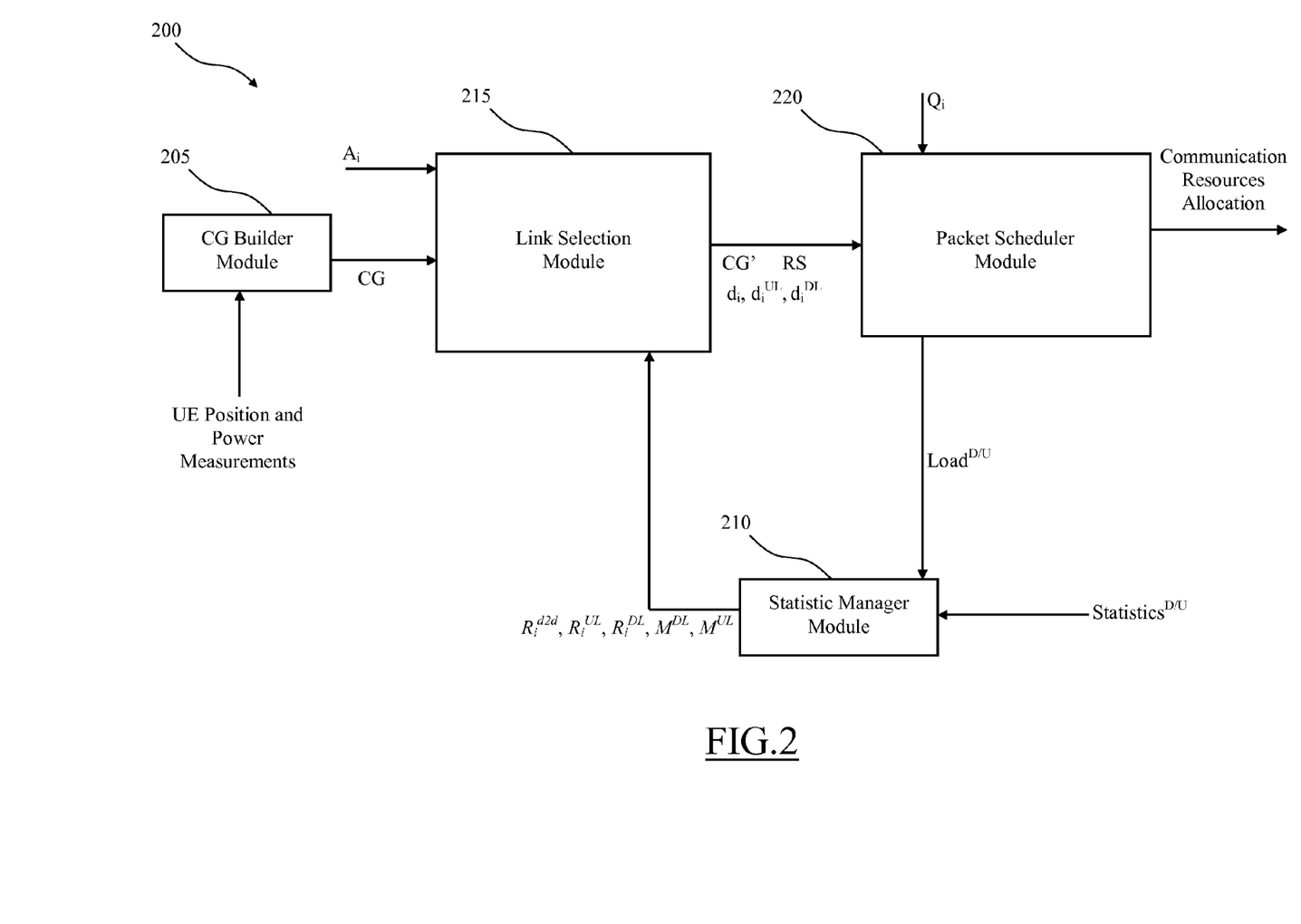
FIG. 2 is a schematic block diagram of a portion of a communication system according to an embodiment of the present invention for managing communication in the cell of FIG. 1.

Turning now to FIG. 2, it is a schematic block diagram of a portion of a communication system 200 according to an embodiment of the present invention for managing communication in the cell 100.

The communication system 200 is adapted to manage the selection between communication types (i.e., INFRA communication or D2D communication) and the allocation of communication resources (e.g., by means of a scheduling of communication data packets over resource blocks) for all the communication of the UE 110a-f in the cell 100.

The communication system 200 comprises a conflict graph (CG) builder module 205 that may be a module/function located in an eNodeB of the mobile communication network such as the eNodeB 105 in the cell 100 and configured to compute a conflict graph CG based on positions and transmission powers of all the UE 110 inside the cell 100. For example, the transmission powers of all the UE 110a-f inside the cell 100 are known to, and provided by, the eNodeB 105, while the position of the UE 110a-f may be obtained by means of a known positioning technique (e.g., using GPS signals, network signals or a combination thereof). The conflict graph CG is a graph where a communication (already active or to be established) between any two UE, such as the UE 110c and 110d, and the UE 110e and 110f in the example of FIG. 1, is indicated as a graph node, and a graph edge connecting two nodes denotes a conflict between the corresponding communications (i.e., such communications provoke reciprocal interferences). An edge between two graph nodes implies that a separate allocation of resources is required for preventing a conflict between the two communications represented by such nodes.

The communication system 200 also comprises a statistic manager module 210 that may be a module/function located in an eNodeB of the mobile communication network such as the eNodeB 105 in the cell 100 and configured to provide indications regarding available communication rates, or simply rates (e.g., expressed as bit per second bps), for INFRA and D2D communications and amounts of available downlink/uplink resources (i.e., resources available for downlink/uplink channels) for INFRA and D2D communications based upon information Load$^{D/U}$ about downlink/uplink communication resources actually allocated and usage metrics Statistics$^{D/U}$ of the downlink/uplink communication resources (i.e., statistics data regarding ongoing communication managed by the communication system, for example obtained from the Channel Quality Indication provided by the UE 110a-f to the eNodeB 105) thereof under the viewpoint of both downlink and uplink channels. For example, the statistic manager module 210 provides indications regarding:

- an amount of available downlink resources (e.g., expressed in PRBs) $M^{DL}$, and
- an amount of available uplink resources (e.g., expressed in PRBs) $M^{UL}$.

In addition, for each communication $c_i$ (e.g., 0≤i≤I; with I being a positive integer) in the cell 100 (either a communication to be established or an already on-going communication), the statistic manager module 210 provides indications regarding:

- an available rate for a communication $c_i$ if it is a D2D communication $R_i^{D2D}$;
- an available uplink rate for a communication $c_i$ if it is a INFRA communication $R_i^{UL}$, and
- an available downlink rate for the communication $c_i$ if it is the INFRA communication $R_i^{DL}$.

In other words, the rate $R_i^{D2D}$ is the rate that the communication $c_i$ would have if performed as a D2D communication; it should be noted that the rate $R_i^{D2D}$ is equal to zero if the UE involved in the communication $c_i$ are beyond a D2D range within which such UE are capable of performing a D2D communication. The rates $R_i^{UL}$ and $R_i^{DL}$ are the rates (for the uplink channel and the downlink channel, respectively) that the communication $c_i$ would have if performed as an INFRA communication.

In one embodiment of the present invention, the communication system 200 comprises a link selection module 215, which is configured and operable to select the communication type (i.e., D2D or INFRA communication) between two (or more) UEs 105. For example, the link selection module 215 may be a module/function located in an eNodeB of the mobile communication network such as the eNodeB 105 in the cell 100. The link selection module 215 is coupled with the CG builder module 205 for receiving the conflict graph as an input. The link selection module 215 is coupled with the statistic manager module 210 for receiving therefrom the aforementioned indications $M^{DL}$, $M^{UL}$, $R_i^{D2D}$, $R_i^{UL}$, and $R_i^{DL}$ as inputs. Finally, the link selection module 215 receives a requested rate $A_i$ for the considered communication $c_i$, as a further input; such requested rate $A_i$ may be provided by the Evolved Packet Core (EPC—not detailed in FIG. 2) of the communication system 200 according to a communication traffic in the mobile telecommunication network.

The link selection module 215 selects whether to establish, or switch to if already active, the communication $c_i$ as an INFRA communication or as a D2D communication on the basis of the received inputs (as described in the following). The link selection module 215 provides as output a communication command which determines whether the communication $c_i$ has to be established as, or switched to if already active, an INFRA communication or a D2D communication. In one embodiment of the invention, the communication command comprises a first binary variable $d_i$ (e.g., one bit) that defines if the communication $c_i$ is an INFRA or D2D communication e.g., $d_i$=0 corresponds to INFRA communication, while $d_i$=1 corresponds to D2D communication and, if the D2D communication is selected (i.e., $d_i$=1) a second binary variable $d_i^{UL}$ (e.g., one bit) that defines if the D2D communication is to be established via uplink e.g., $d_i^{UL}$=1 corresponds to uplink selected, while $d_i^{UL}$=0 corresponds to uplink not selected—a third binary variable $d_i^{DL}$ (e.g., one bit) that defines if the D2D communication is to be established via downlink—e.g., $d_i^{DL}$=1 corresponds to downlink selected, while $d_i^{DL}$=0 corresponds to downlink not selected. In an alternative embodiment, a single binary variable is provided that defines if the D2D communication is to be established via downlink or uplink—e.g., the single binary variable set to 1 corresponds to uplink, while the single binary variable set to 0 corresponds to downlink.—

The link selection module 215 further provides as output also a modified conflict graph (CG'), corresponding to the conflict graph CG modified in order to take into account the communication command (e.g., if a communication $c_i$ of the D2D-type was interfering with other communications, by switching such communication $c_i$ from D2D communication to INFRA communication the edge in the CG is deleted, since the LTE/LTE-A standard already guarantees that communication resource sharing between UE performing INFRA communication is avoided according to).

Preferably, the link selection module 215 further provides as output also a restrictions command RS. For example, the restrictions command RS comprises a set of restrictions regarding the communication resources in use within the cell 100. In an embodiment of the present invention, the restrictions command RS is provided in the format {[UE_group], [PRBs]}, where UE_group denote (e.g., lists) any set of UE (e.g., UE performing D2D communication, UE exploiting uplink and/or downlink channels, UE located along cell edges etc.) and PRBs denote the resources that should be associated with that set of UE (e.g., communication resources that are reserved for the corresponding UE listed in the UE_group, as described in the following).

In one embodiment of the present invention, the communication system 200 also comprises a packet scheduler module 220, configured to allocate communication resources on the basis of the outputs of the link selection module 215 (as described in the following). To this extent, the packet scheduler module 220 is coupled with the link selection module 215 for receiving as inputs the outputs of the link selection module 215. For example, the packet scheduler module 220 may be a module/function located in an eNodeB of the mobile communication network such as the eNodeB 105 in the cell 100

In addition, the packet scheduler module 220 receives as an input an indication $Q_i$ regarding the amount of data to be transmitted during the communication $c_i$. For example, the indication $Q_i$ is directly provided to the packet scheduler module by the eNodeB 105, which manages the amount of data, transmitted through downlink channels and knows the amount of data transmitted through uplink channels from Buffer Status Reports (BSR) provided by the UE 110a-f within the cell 100.

On the basis of the inputs received, the packet scheduler module 220 performs the allocation of the communication resources for each communication $c_i$ within the memory cell 100. In other words, the packet scheduler module 220 schedules in which resource block each data packet belonging to the communication $c_i$ has to be exchanged (i.e., transmitted and/or received); therefore, the allocation of communication resources is often indicated as packet scheduling. Such a packet scheduling is then provided to the UE 110a-f within the cell 100, which then communicate accordingly.

Along with the resource allocation, the packet scheduler module 220 outputs the information about actually allocated communication resources Load$^{D/U}$ that are provided to the statistic manager module 210.

It should be noted that the link selection module 215, the packet scheduler module 220 and the statistic manager module 210 form a feedback loop that allows increasing the efficiency of the operation of selection and the packet scheduling of each communication $c_i$ on the basis of the actually allocated communication resources Load$^{D/U}$ and on the basis of the usage metrics Statistics$^{D/U}$ (i.e., an actual state and past states of the mobile communication network).

In one embodiment of the present invention, the CG builder module 205, the statistic module 210 and the link selection module 215 provide their outputs with a link selection period TLS greater than a Transmission Time Interval or TTI (which is the duration of a transmission of a data packet over uplink or downlink channels) since the selection between INFRA communication and the D2D communication, particularly in case of a switching of communication type involve a certain overhead time, and it would be computationally hard performing it with a TTI periodicity. Moreover, having the link selection module 215 operating with a periodicity equal to the link selection period TLS, longer than a Transmission Time Interval TTI, a frequent switching between INFRA and D2D types for an ongoing communication is avoided; such a frequent switching between INFRA and D2D communication types would be detrimental for such ongoing communication. Indeed, with a INFRA/D2D switching with a periodicity equal to a Transmission Time Interval, fragments (e.g., one or more data packets) of the ongoing communication would be sent to the eNodeB during INFRA-type communication, while fragments of the ongoing communication would be sent to the receiver UE during D2D-type communication; therefore, part of the fragments of the ongoing communication would be unattainable by the eNodeB and/or by the receiver UE, thereby requiring a retransmission of such fragments to one between the eNodeB (for INFRA-type communication) or to the receiver UE (for the D2D-type communication) in order to allow a correct reassembly of the ongoing communication (consequently lowering a quality of the communication and increasing the workload for the mobile communication network). For example, the link selection period TLS has a duration of the order of one hundred of millisecond, greater than a TTI (which has a duration of 1 ms in LTE/LTE-A).

Conversely, the packet scheduler module 220 provides its outputs with a periodicity equal to one TTI, which allows the eNodeB 105 properly managing each communication $c_i$ in the memory cell 100 in real time (i.e., without causing delays in the communication c).

Focusing on the operation of the link selection module 215, the latter determines which, between D2D communication and INFRA communication, is better for two UE, such as the UE 110c and 110d, and the UE 110e and 110f within the cell 100, according to a criterion aimed at optimizing one (or more) parameter of interest of the communication (e.g., a throughput). In the case of the selection of D2D communication, the link selection module 215 also determines on which channel (i.e., downlink or uplink channel) allocate the D2D communications according to the same criterion.

The link selection module 215 is aware of:
the communication-rate requirements of each communication $c_i$ thanks to the rate $A_i$,
the achievable rates due to resource usage, thanks to the rates $R_i^{D2D}$, $R_i^{DL}$, $R_i^{DL}$, and
both downlink and uplink resources status (i.e., availability), thanks the quantities $M^{DL}$ and $M^{UL}$.

In addition, thanks to the conflict graph CG, the link selection module 215 is aware of any possibly conflicting communications within the cell 100.

Therefore, the link selection module 215 performs the selection of the communication type not only by evaluating the available communication resources (or channel condition) but also evaluating separately the available downlink and uplink resources, or space (conversely, should only the channel condition be considered, then a D2D communication could be switched to an INFRA communication also in case of no available downlink resources).

In one embodiment of the invention, the link selection module 215 selects the communication type by solving an optimization problem. For example an objective function of such an optimization problem may be expressed as:

$$\max \sum_{i \in I} x_i^{D2D-UL} \times R_i^{D2D} + x_i^{D2D-DL} \times R_i^{D2D} + x_i^{UL} \times \min\{R_i^{UL}, R_i^{DL}\}, \quad (1)$$

wherein the variables $x_i^{D2D-UL}$, $x_i^{D2D-3L}$ e $x_i^{UL}(\in R^+)$ represent an allocated communication resource to the communication $c_i$ performed as a D2D communication on the uplink channel, as a D2D communication on the downlink channel and as an INFRA communication, respectively. It should be noted that, during the solution of the optimization problem, only one among the variables $x_i^{D2D-UL}$, $x_i^{D2D-DL}$ e $x_i^{UL}$ will have a non-zero value at a time, since a generic communication $c_i$ will be performed as one among a D2D communication on the uplink channel, a D2D communication on the downlink channel or an INFRA communication.

The objective function (1) is solved according to the following constraints:

$$d_i \geq d_i^{DL}; \quad (2)$$

$$d_i \geq d_i^{UL} \quad (3)$$

inequalities (2) and (3) define that a generic communication $c_i$ is performed as D2D communication (either on downlink channel or on uplink channel) only if the first binary variable is equal to one;

$$d_i^{UL} + d_i^{DL} \leq 1 \quad (4)$$

inequality (4) defines that only one between the downlink channel and the uplink channel may be selected for the communication $c_i$ of the D2D-type;

$$n^{D2D-DL} + \sum_{i \in I} x_i^{UL} \times R_i^{UL} / R_i^{DL} \leq M^{DL}, \quad (5)$$

where $e^{D2D-DL}$ ($\in R^+$) represents the communication resources allocable for performing D2D communication on the downlink channel, $$\sum_{i \in I} x_i^{UL} \times R_i^{UL} / R_i^{DL}$$

represents the communication resources allocable for the portion of INFRA communication performed on the downlink channel, and inequality (4) defines that allocable communication resources have to be lower than, or at most equal to, the amount of available downlink resources $M^{DL}$;

$$n^{D2D-UL} + \sum_{i \in I} x_i^{UL} \leq M^{DL}, \tag{6}$$

where $n^{D2D-UL}$ ($\in R^+$) represents the communication resources allocable for performing D2D communication on the uplink channel, $$\sum_{i \in I} x_i^{UL}$$

represents the communication resources allocable for the portion of INFRA communication performed on the uplink channel, and inequality (5) defines that allocable communication resources have to be lower than, or at most equal to, the amount of available uplink resources $M^{UL}$;

$$x_i^{D2D-DL} \times R_i^{D2D} + x_i^{D2D-UL} \times R_i^{D2D} + x_i^{UL} \times R_i^{UL} \leq A_i, \tag{7}$$

inequality (7) defines that the communication resources allocated for the communication $c_i$ have to be lower than, or at most equal to, the requested rate $A_i$ for the considered communication $c_i$;

$$x_i^{UL} \leq \min\{M^{UL}, A_i/R_i^{UL}\} \times (1-d_i), \tag{8}$$

inequality (8) defines that the amount of communication resources to be allocated for the portion of INFRA communication performed on the uplink channel cannot exceed the available resources of the uplink channel $M^{UL}$ and the requested uplink rate for the communication $c_i$ (it should be noted that $x_i^{UL}=0$ if $d_i=1$, i.e. for D2D communication);

$$x_i^{D2D-UL} \leq \min\{M^{UL}, A_i/R_i^{D2D}\} \times d_i^{UL}, \tag{9}$$

inequality (9) defines that the amount of communication resources to be allocated for D2D communication performed on the uplink channel cannot exceed the available resources of the uplink channel $M^{DL}$ and the requested uplink rate for the communication $c_i$ (it should be noted that $x_i^{D2D-UL}=0$ if $d_i^{DL}=1$);

$$x_i^{D2D-DL} \leq \min\{M^{DL}, A_i/R_i^{D2D}\} \times d_i^{UL}, \tag{10}$$

inequality (10) defines that the amount of communication resources to be allocated for D2D communication performed on the downlink channel cannot exceed the available resources of the uplink channel $M^{DL}$ and the requested downlink rate for the communication $c_i$ (it should be noted that $x_i^{D2D-DL}=0$ if $d_i^{DL}=1$);

$$\pi_i^{UL} + x_i^{D2D-UL} \leq \pi_j^{UL} + L \times [o_{ij}(1-d_i^{UL}) + (1-d_j^{UL})], \tag{11}$$

where L is a positive constant having a value greater than a number of available communication resources (i.e., the number of PRB), $o_{ij}$ is a binary variable, which is equal to 1 if a communication resource of a conflicting communication j precedes the communication resource of a communication i in the uplink channel, and 0 otherwise, and variable $\pi_i^{UL}$ ($\in R^+$) defines an initial point in the uplink channel from which the communication resources allocated to the communication $c_i$ starts;

$$\pi_j^{UL} + x_j^{D2D-UL} \leq \pi_i^{UL} + L \times [(1-o_{ij}) + (1-d_i^{UL}) + (1-d_j^{UL})], \tag{12}$$

the inequalities (11) and (12) consider conflict sequencing constraints for a communication $c_i$ of the D2D-type conflicting with a communication $c_j$ on the uplink channel (as defined in the conflict graph CG)—it should be noted that these two constraints are meaningful only if both communications $c_i$ and $c_j$ are conflicting communications scheduled on the uplink channel, otherwise they are always verified— In this case, if $o_{ij}$ is equal to 0, then inequality (11) will be active and communication $c_i$ will be allocated after communication $c_j$ has been, otherwise, if $o_{ij}$ is equal to 1, then inequality (12) will be active and communication $c_i$ will be allocated before communication $c_j$ has been;

$$\pi_i^{UL} + x_i^{D2D-UL} \leq n^{D2D-UL} + L \times (1-d_i^{UL}), \tag{13}$$

inequality (13) defines that $n^{D2D-UL}$ is the upper bound of the communication resources of the uplink channel allocated to the communication $c_i$ of the D2D-type performed on the uplink channel;

$$\pi_i^{DL} + x_i^{D2D-DL} \leq \pi_j^{DL} + L \times [o_{ij} + (1-d_i^{DL}) + (1-d_j^{DL})]; \tag{14}$$

$$\pi_j^{DL} + x_j^{D2D-DL} \leq \pi_i^{DL} + L \times [(1-o_{ij}) + (1-d_i^{DL}) + (1-d_j^{DL})]; \tag{15}$$

$$\pi_i^{DL} + x_i^{D2D-DL} \leq n^{D2D-DL} L \times (1-d_i^{DL}), \tag{16}$$

the inequalities (14), (15) and (16) corresponds to inequalities (11), (12) and (13) for a communication $c_i$ of the D2D-type performed on the downlink channel, with ($\in R^+$), with variable $\pi_i^{DL}$ ($\in R^+$) that defines an initial point in the downlink channel from which the communication resources allocated to the communication $c_i$ start.

Solving the optimization problem allows the link selection module 215 determining the outputs $d_i$, $d_i^{UL}$, $d_i^{DL}$, RS and CG'

Focusing now on the packet scheduler module 220, the latter preferably comprises two scheduler branches (not shown in FIG. 2) each of which managing the allocation of a respective part of the communication resources. Namely, an uplink scheduler branch is dedicated to uplink resources allocation and a downlink scheduler branch dedicated to downlink resources allocation. Each scheduler branch allocates the respective uplink/downlink resources by applying a predetermined allocation scheme, such as for example the Maximum Carrier-to-Interference Ratio (MaxC/I) scheduling, the Round Robin (RR) scheduling, or the Proportionally Fair (PF) scheduling, combined with the outputs $d_i$, $d_i^{UL}$, $d_i^{DL}$, RS and CG' provided by the link selection module 215 at each link selection period TLS and combined with the indication $Q_i$ (regarding the amount of data to be transmitted) received at each TTI. Particularly, the scheduler branches, by respecting the edges indicated in the modified conflict graph CG', may share the same downlink/uplink resources between UE 110*a*, 110*b*, 110*c* and 110*d* involved in INFRA communications and UE 110*e* and 110*f* involved in D2D communication that do not interfere with each others (while downlink/uplink resource sharing between UE 110*a*, 110*b*, 110*c* and 110*d* involved in INFRA communication is avoided according to LTE/LTE-A standard).

Figure 3:
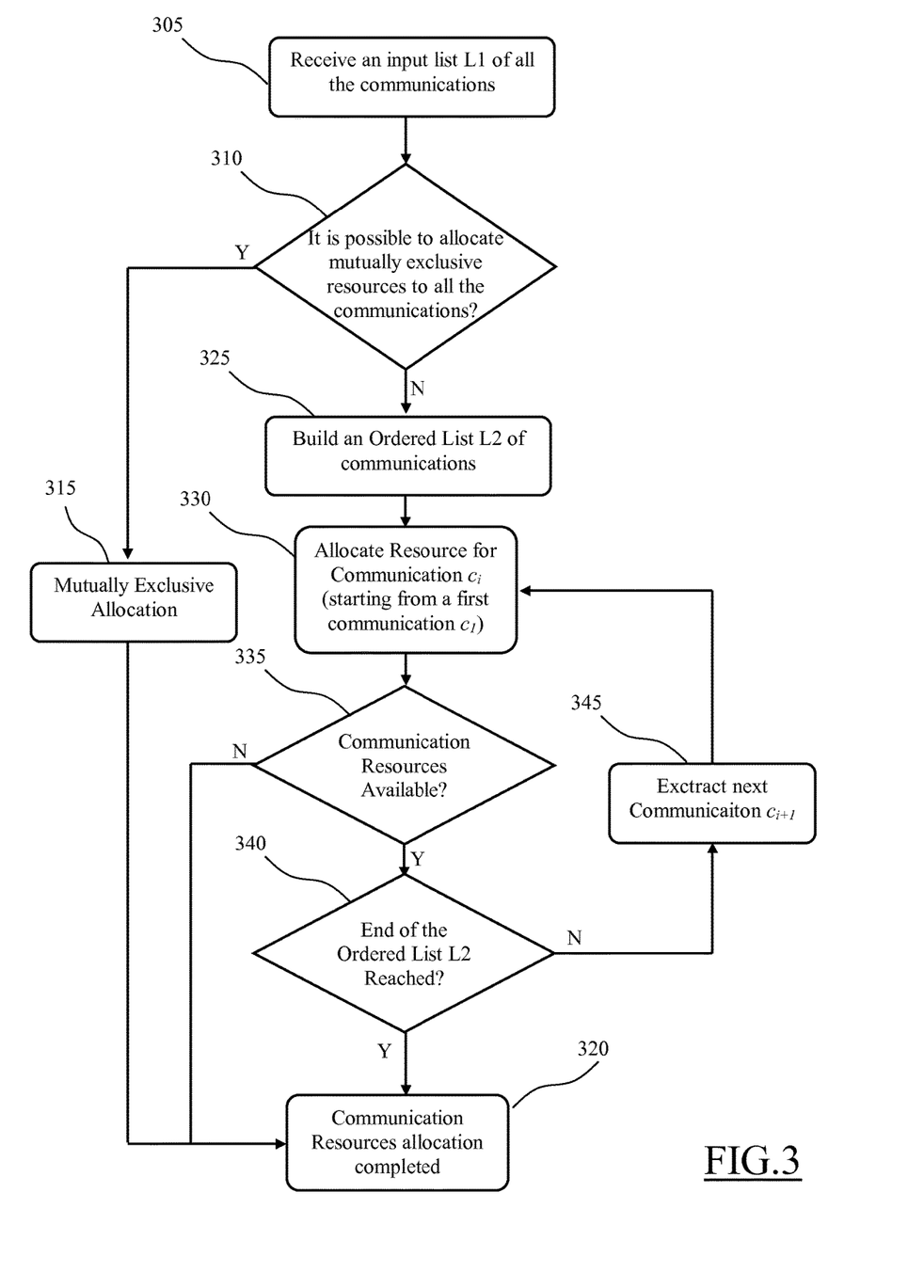
FIG. 3 is a schematic flowchart of a resource allocation operation according to an embodiment of the present invention for the communication system of FIG. 2.

Turning now to FIG. 3, it is a schematic flowchart of a resource allocation operation according to an embodiment of the present invention for the communication system 200.

Initially, at step 305 the packet scheduler module 220 receives an input list L1 of all the I communications $c_i$ taking place in the cell 100 in the next TTI, then at step (decision block) 310 the packet scheduler module 220 checks whether it is possible to allocate mutually exclusive resources to all the I communications $c_i$ taking place in the cell 100. In the affirmative case (exit branch Y of decision block 310), such allocation of mutually exclusive resources is done at step 315; the allocation of mutually exclusive resources ensures the maximum throughput and the minimum interference attainable between the I communications $c_i$ and, and the operation ends at step 320.

In the negative case (exit branch N of decision block 310), i.e. in case the mutually exclusive resources allocation is not possible, at step 325 and ordered list L2 of the I communications $c_i$ taking place in the cell 100 is generated by the packet scheduler module 220. For example, the ordering of the ordered list L2 may be implemented according to any suitable allocation schemes (e.g., MaxC/I, PF or RR scheduling mentioned above).

Next, at step 330, starting from a first communication $c_f$ in the ordered list L2, the packet scheduler module 220 allocates the communication resources to any communication $c_i$ taking into account the communication type indicated in the binary data $d_i$ and $d_i^{UL}$, $d_i^{DL}$, the modified conflict graph CG' and the restrictions command RS. At step (decision block) 335 the packet scheduler module 220 verifies if there are communication resources available for allocation. In the negative case (exit branch N of decision block 335), the allocation operation ends at step 320.

In the affirmative case (exit branch Y of decision block 335), i.e. there are available communication resources, the packet scheduler module 220 at step (decision block) 340 verifies if the end of the ordered list L2 of the I communications $c_i$ taking place in the cell 100 has been reached. In the negative case (exit branch N of decision block 340), the packet scheduler module 220 at step 345 extracts the next communication $c_{i+1}$ from the ordered list L2 and the operations return at step 330, for allocating communication resources to the next communication $c_{i+1}$.

In the affirmative case (exit branch Y of decision block 340), i.e. the end of the ordered list L2 has been reached and the operation ends at step 320.

In this way, the resources are allocated, for the next TTI. The packet scheduler module 220 repeats the above operations for the subsequent TTIs. During a same link selection period TLS, the inputs $d_i$, $d_i^{UL}$, $d_i^{DL}$, RS and CG' do not change. At the end of a link selection period TLS, the inputs $d_i$, $d_i^{UL}$, $d_i^{DL}$, RS and CG' to the packet scheduler module 220 may change.

Up to now, a scenario of D2D communications between UE under a same network cell has been considered. In an embodiment of the present invention, the communication system may be configured to handle D2D communications also between two UEs located in different cells.

Figure 4:
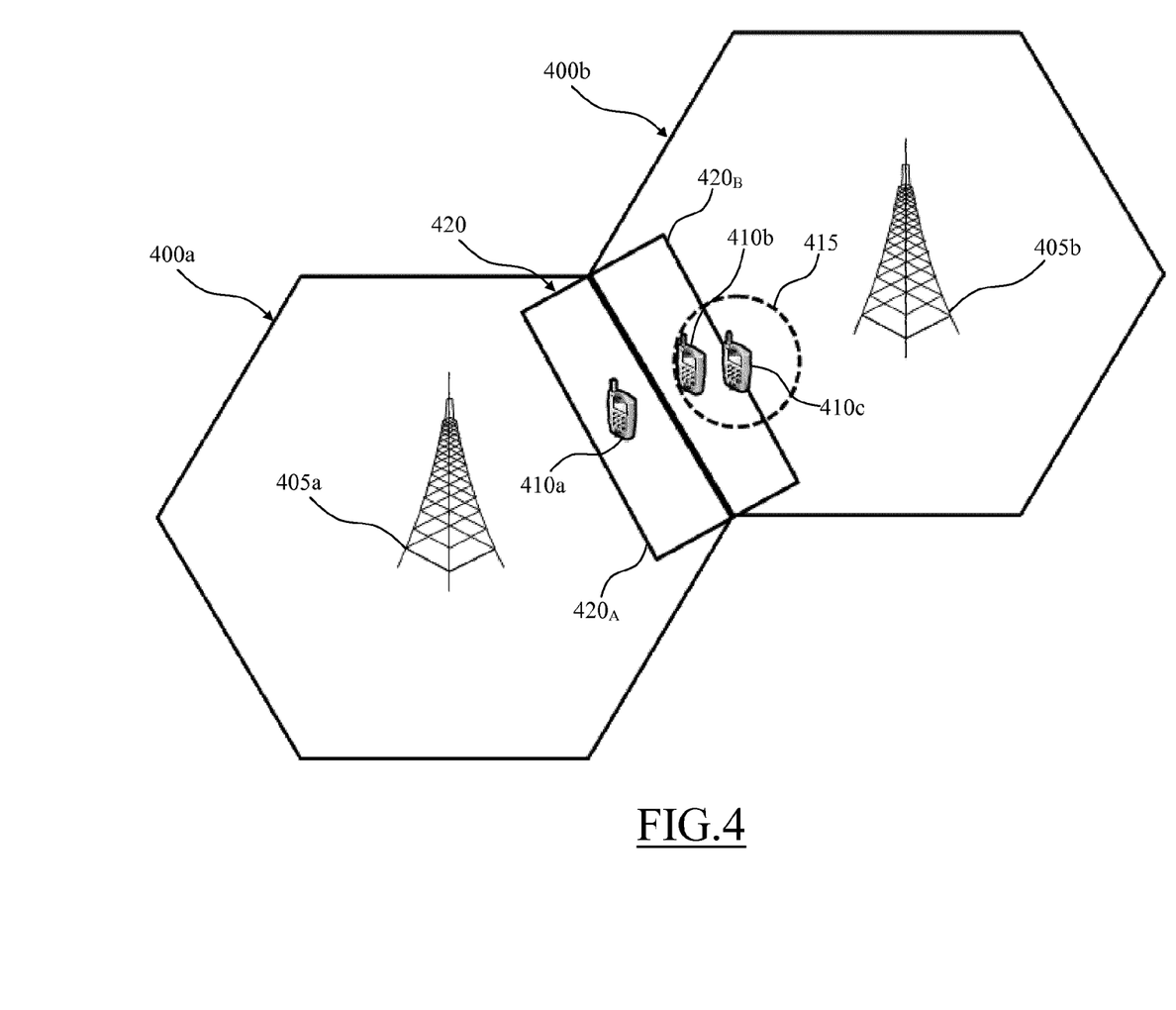
FIG. 4 is a schematic view of a pair of adjacent cells of a mobile communication network in which an embodiment of the present invention can be implemented.

Turning now to FIG. 4, it is a schematic view of a pair of cells 400a e 400b of a mobile communication network in which an embodiment of the present invention may be implemented. In particular, in the example considered the two cells are assumed to be adjacent cells, but the solution is not limited to pairs of adjacent cells (e.g., in the case of small cells).

In the following, elements similar to elements described with reference to FIG. 1 are denoted by similar numeral references and their description is not repeated for sake of brevity.

In the example of FIG. 4, communications within a first cell 400a of the pair of adjacent cells 400a are managed by a first eNodeB 405a, while communications within the second cell 400b of the pair of adjacent cells 400a are managed by a second eNodeB 405b.

Two UE, namely a first UE 410a, within the first cell 400a, and a second UE 410b, within the second cell 400b, are involved in an inter-cell D2D communication. A third UE 410c within the second cell 400b may cause interference to the inter-cell D2D communication between UE 410a and 410b and, viceversa, UE 410a and 410b in D2D communication may cause interference to a communication performed by the third UE 410c.

The two-cell scenario of FIG. 4 has to be construed has a simplification of a more general multi-cell scenario. In a preferred embodiment, inter-cell D2D communications are managed over a selected group of cells of the mobile communication network, e.g. a selected group of cells may comprise a central cell and all the adjacent cells (i.e., generally 6 cells) adjacent to the central cell.

Figure 5:
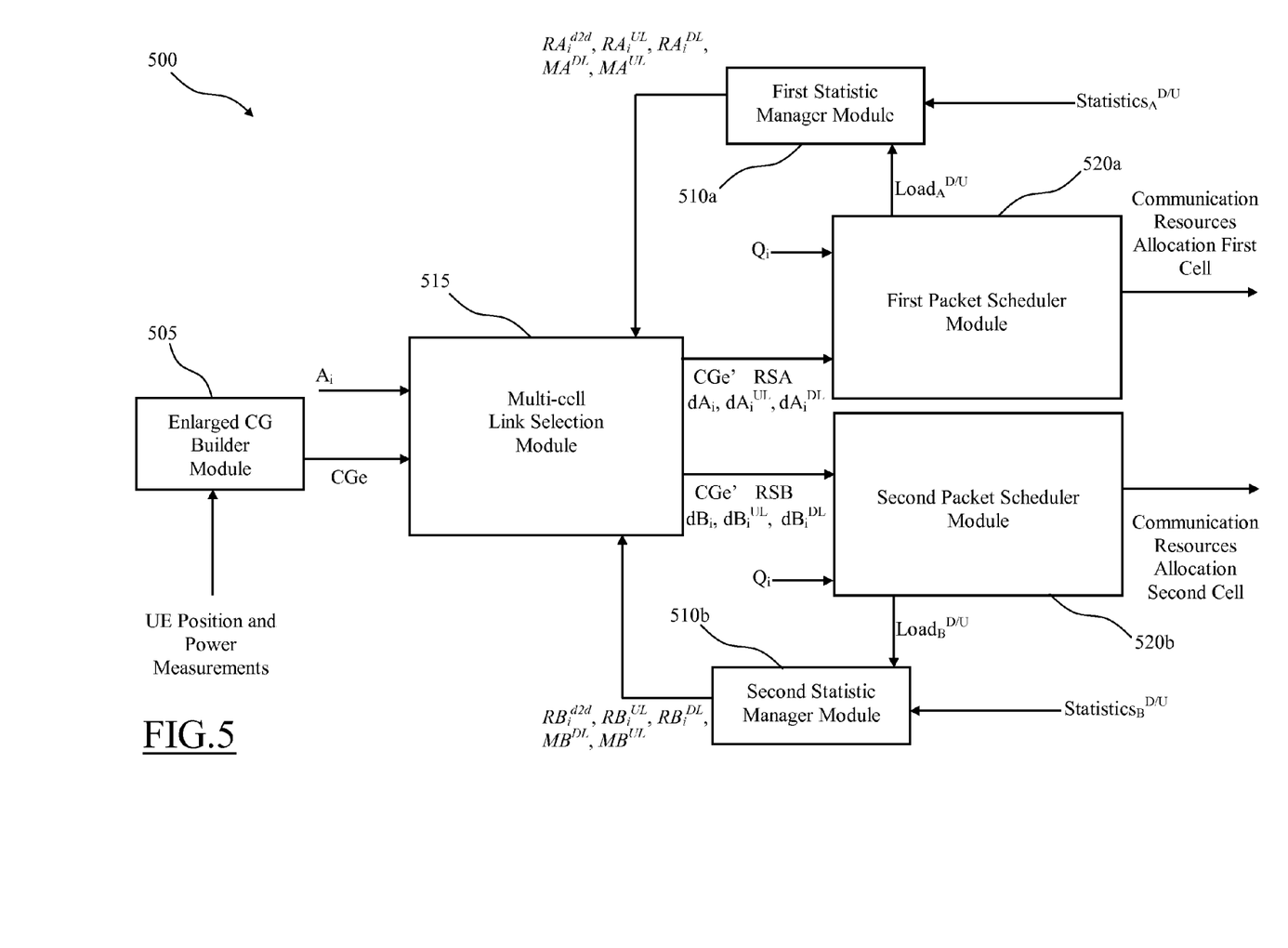
FIG. 5 is a schematic block diagram of a communication system according to an embodiment of the present invention for managing communications in a plurality of cells of the mobile communication networks, such as in the cells of FIG. 4.

Considering now FIG. 5, it is a schematic block diagram of a communication system 500 according to an embodiment of the present invention for managing communications in a plurality of cells of the mobile communication networks, such as the cells 400a and 400b.

In the following similar elements to elements described with reference to FIG. 2 are denoted by similar numeral reference.

The communication system 500 comprises an enlarged CG builder module 505 adapted to provide an enlarged conflict graph CGe based on the position of the users inside adjacent cells, such as the first cell 400a and the second cell 400b in the example of FIG. 4, and their respective transmission powers.

In one embodiment of the invention, the enlarged CG builder module 505 receives UE position and transmission power information from all the cells in the mobile communication network or from the selected group of cells (e.g., seven cells of which one cell is a central cell of the group and the remaining six cells are adjacent to the central cell) of the mobile communication network.

In one embodiment of the invention, in LTE/LTE-A standards the enlarged CG builder module 505 may be a module/function part of the Evolved Packet Core (EPC not shown) of the communication system 500 connected to all the eNodeBs of the mobile communication network, or may be a module/function comprised in an eNodeB, such as the eNodeB 400a or 400b of the example of FIG. 4, of the selected group of cells of the mobile communication network mentioned above.

A multi-cell link (selection module 515 is provided to perform the selection of the communication type for the UE 405a, 405b and 405c, comprised in adjacent cells, i.e. the cells 400a and 400b in the example of FIG. 4.

In one embodiment of the invention, the multi-cell link selection module 515 receives UE position transmission power information from all the cells in the mobile communication network. For example, in LTE/LTE-A standards, the multi-cell link selection module 515 may be comprised in an Evolved Packet Core (EPC not shown) of the communication system 500 connected to all the eNodeBs of the mobile communication network, or may be a module/function comprised in an eNodeB, such as the eNodeB 400a or 400b of the example of FIG. 4, of the selected group of cells of the mobile communication network mentioned above.

Conversely, in an embodiment of the present invention the communication system 500 comprises a packet scheduler module for managing the allocation of communication resources and a statistics manager module for providing indications about amounts of available communication resources and rates in each respective cell of the mobile communication network.

In the example of FIG. 5, the communication system comprises a first packet scheduler module 520a for managing the allocation of communication resources in the first cell 400a and a first statistics manager module 510a for providing indications about amounts of available communication resources $MA^{DL}$ and $MA^{UL}$, and rates $RA_i^{D2D}$, $RA_i^{UL}$, and $RA_i^{DL}$ based on communication resources actually allocated $Load_A^{D/U}$ (provided by the first packet scheduler module 520a to which is coupled) and usage metrics $Statistics_A^{D/U}$ of the communication resources for the first cell 400a. Similarly, the communication system 500 comprises a second packet scheduler module 520b for managing the allocation of communication resources in the second cell 400b and a second statistics manager module 510b for providing indications about amounts of available communication resources $MB^{DL}$ and $MB^{UL}$, and rates $RB_i^{D2D}$, $RB_i^{UL}$, and $RB_i^{DL}$ based on communication resources actually allocated $Load_B^{D/U}$ (provided by the second packet scheduler module 520b to which is coupled) and usage metrics $Statistics_B^{D/U}$ of the communication resources for the second cell 400b.

The multi-cell link selection module 515 is coupled with the enlarged CG builder module 505 for receiving the enlarged conflict graph CGe as an input. The multi-cell link selection module 515 is coupled with the first statistic manager module 510a for receiving corresponding indications $MA^{DL}$, $MA^{UL}$, $RA_i^{D2D}$, $RA_i^{UL}$a, and $RA_i^{DL}$ (referred to the first cell 400a) as inputs. At the same time, multi-cell link selection 515 is coupled with the second statistic manager module 510b for receiving corresponding indications $MB^{DL}$, $MB^{UL}$, $RB_i^{D2D}$, $RB_i^{UL}$, and $RB_i^{DL}$ (referred to the second cell 400b) as inputs. Finally, the multi-cell link selection module 515 receives a requested rate $A_i$ for the communication $c_i$, as a further input.

The multi-cell link selection module 515 selects whether to establish the communication $c_i$ as an INFRA communication or as a D2D communication based on the received inputs (similarly as described above) for the UE 410a, 410b and 410c in both the cells 400a and 400b. The multi-cell link selection module 515 is connected to both the first packet scheduler module 520a and the second packet scheduler module 520b for providing them a respective communication command which determines whether the communication $c_i$ has to be established as, or switched to if already active, an INFRA communication or a D2D communication. In one embodiment of the invention, the communication command for the first packet scheduler module 520a comprises a first binary variable $dA_i^{UL}$ (e.g., a bit) that defines if the communication $c_i$ is an INFRA or D2D communication in the first cell 400a and, if the D2D communication is selected, a second binary variable $dA_i^{UL}$ and a third binary variable $dA_i^{DL}$ that defines if the D2D communication has to be established via downlink or uplink channels in the first cell 400a. Similarly, the communication command for the second packet scheduler module 520b comprises a fourth binary variable $dB_i$ (e.g., a bit) that defines if the communication $c_i$ is an INFRA or D2D communication in the second cell 400b and, if the D2D communication is selected, a fifth binary variable $dB_i^{UL}$ and a sixth binary variable $dA_i^{DL}$ that defines if the D2D communication has to be established via downlink or uplink channels in the second cell 400b. It should be noted that the link selection module 515 selecting the INFRA-type for a communication $c_i$ will provide a communication command referred to such communication $c_i$ only for the cell 405a or 405b in which there is/are the UE that perform (or will perform) such communication $c_i$.

The multi-cell link selection module 515 also provides to both the first packet scheduler module 520a and the second packet scheduler module 520b a modified enlarged conflict Graph (CGe) modified in order to take into account the communication commands provided.

The multi-cell link selection module 515 provides as output also a first restrictions command $RS_A$ and a second restrictions command $RS_B$ to the first packet scheduler module 520a and the second packet scheduler module 520b, respectively.

Preferably, in such a multi-cell scenario, each one of the restrictions commands $RS_A$ and $RS_B$ comprises a set of restrictions regarding the communication resources to be allocated to a UE_group listing UE, such as he UE 410a, 410b and 410c, near boundaries (e.g., within an interference region 420 described below) of two (or more) adjacent cells, such as the first cell 400a and the second cell 405b.

In one embodiment of the present invention, the enlarged CG builder module 505, the statistic modules 510a and 510b and the multi-cell link selection module 515 provide their outputs with a link selection period TLS greater than a TTI as explained above with reference to the single-cell scenario of FIG. 1. For example, the link selection period TLS has a duration in the order of hundred of milliseconds, greater than a TTI (1 ms) in LTE/LTE-A. Conversely, the packet scheduler modules 520a and 520b provides their outputs with a periodicity equal to the TTI, as explained above with reference to the single-cell scenario of FIG. 1.

A scenario for the communication system 500 is the management of a D2D communication between the two UE 410a and 410b within two adjacent cells 400a and 400b and served by different eNodeBs 405a and 405b, respectively (as shown in FIG. 4).

The communication system 500 coordinates the allocation of communication resources between the two cells 400a and 400b in order to reduce possible interference between the UE 410a, 410b and 410c (and any other UE within the cells 400a and 400b, not shown).

In one embodiment of the invention, the coordination of communication resources allocation is performed by the multi-cell link selection module 515 by coordinating the operation of the two packet scheduler modules 520a and 520b, thus with a periodicity equal to the link selection period TLS.

In the example of FIG. 4, the first UE 410a within the first cell 400a is transmitting to the second UE 410b within the second cell 405b by performing a D2D communication $c_{ab}$. The third UE 410c within the second cell 400b is one of the possible interferer to D2D communication $c_{ab}$, particularly for the second UE 410b (under the assumption that a sharing of communication resources between D2D communications and INFRA communications is allowed in the second cell 400b). The dashed circle enclosing the second UE 410b and the third UE 410c represents an "interference radius" 415 of the third UE 410c. Within such interference radius, INFRA communications $c_{int}$ performed by the third UE 410c may interfere with communication $c_{ab}$ performed between the first and the second UE 410a and 410b.

In one embodiment of the invention, in order to reduce interferences the communication system 500 is configured to allocate every possible interfering communication $c_{int}$ (i.e., a node connected by an edge to the node representing the D2D communication $c_{ab}$ in the enlarged conflict graph CGe) on communication resources different from the communication resources allocated to the D2D communication $c_{ab}$.

In one embodiment of the invention, an "interference region" 420 (represented in FIG. 4 by a solid black rectangle) is defined as the region in which D2D communications between UE of different cells, such as the UE 410a and 410b, may experience interferences due to other UE within the interference region 420 that performs INFRA communications, such as in case of the third UE 410c in the second cell 400b, and viceversa INFRA communications may experience interferences due to D2D communications. The interference region 420 extends over both the cells 400a and 400b and thus comprises a first cell 400a portion $420_A$ and a first cell 400a portion $420_B$.

In order to avoid interferences within the interference region 420, the multi-cell link selection module 515 determines any possible interfering communication $c_{int}$ from the analysis of the modified enlarged conflict graph CGe' provided by the enlarged CG builder module 505 and provides the restrictions commands $RS_A$ and $RS_B$ both comprising UE_group listing sets of UE, such as the UE 405a, 405b and 405c comprised within the interference region 420 and PRBs indicating communication resources to be allocated to the UE of the UE_group in a non-interfering way within the interference region 420. For example, the packet scheduler modules 520a and 520b allocate the D2D communication $c_{ab}$ and the INFRA communication $c_{int}$ according to the restrictions commands $RS_A$ and $RS_B$.

Figure 6:
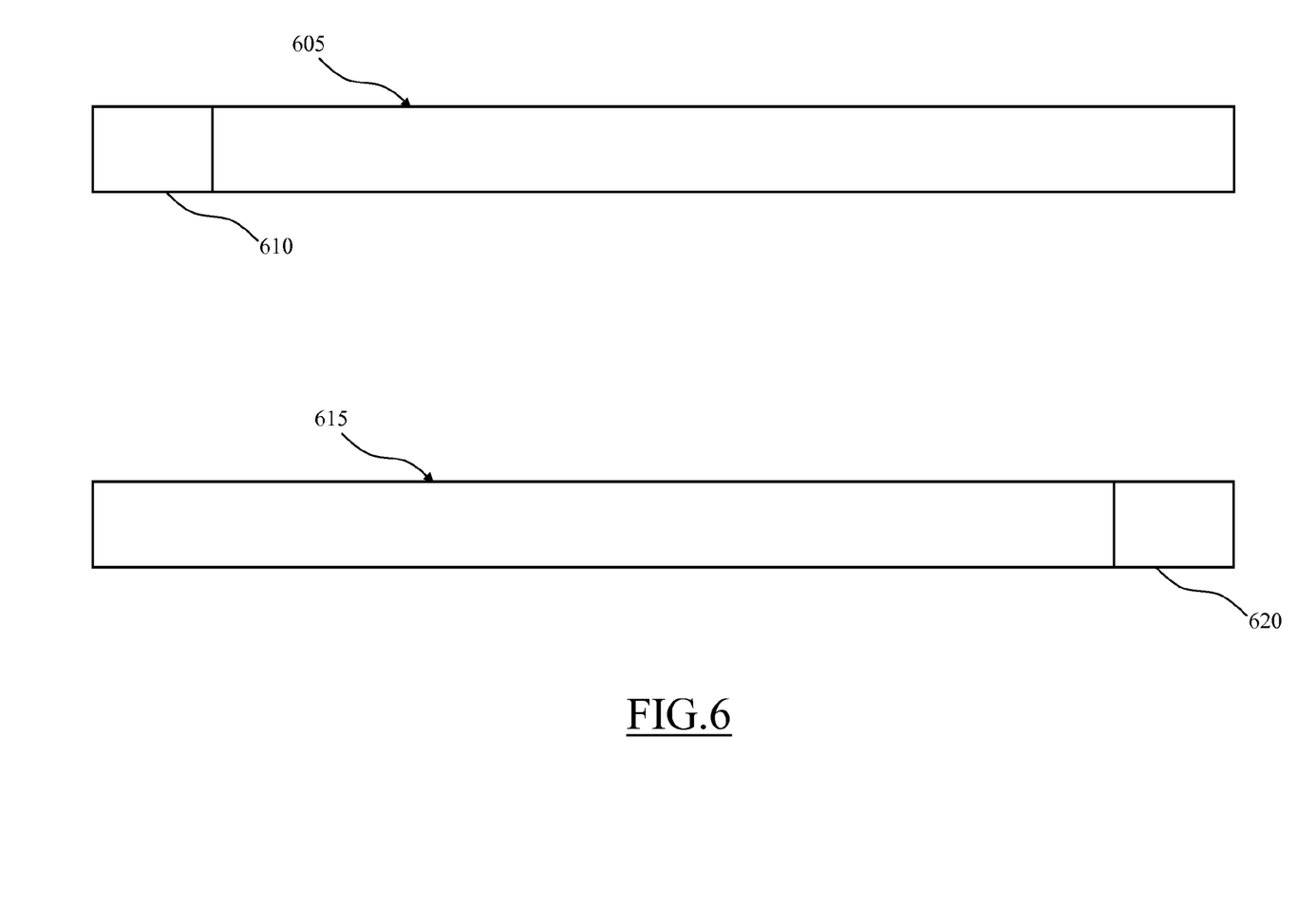
FIG. 6 is a schematic representation of a resources allocation scheme for avoiding interference according to an embodiment of the present invention that can be implemented by the communication system of FIG. 5.

As shown in FIG. 6, which is a schematic representation of a resources allocation scheme for avoiding interference according to an embodiment of the present invention, the packet scheduler modules 520a and 520b may allocate the communication resources $PRB_A$ and $PRB_B$ for the D2D communication $c_{ab}$ and the INFRA communication $c_{int}$, respectively, having a maximum possible distance (in frequency) one with respect to the other.

In the example of FIG. 6, the first packet scheduler module 520a allocates communication resources for the first UE 410a, which transmits data packets to the second UE 410b from within the portion $420_A$ of the interference region 420, on communication resources $PRB_A$ 605 located in an initial portion of the transmission band 610 available for the communications in the first cell 405a. On the contrary, the second packet scheduler module 520b allocates communication resources for the third UE 410c, which transmits data packets from within the portion $420_B$ of the interference region 420, on communication resources $PRB_B$ 615 located in a final portion of the transmission band 620 available for the communications in the first cell 405a. In this way, it is possible to avoid interference between the D2D communication $c_{ab}$ and the INFRA communication $c_{int}$ since the respective communication resources allocated for such communications do not overlap in the frequency domain one another.

In another embodiment of the invention (not shown), for example adapted to be implemented in a mobile communication network of the Centralized Radio Access Network (C-RAN) type, a global packet scheduler module (not shown) may be provided for managing the allocation of resources of UE in all the cells of the mobile communication network or for managing a selected group of cells thereof.

It should be noted that the embodiments of the present invention herein described, may manage efficiently communications resources allocation in order to improve the operation of the mobile communication network taking advantages introduced by the availability of D2D communication (e.g., cell offloading and reduction of used spectrum, and a lower latency with respect to the INFRA communication), without incurring in the drawbacks associated with the coexistence of D2D communications and INFRA communications (e.g., interferences between D2D communications and INFRA communications and D2D communications not controlled by the communication system).

The invention claimed is:

1. A method performed by a communication system of a mobile communication network for allocating communication resources for communications performed by a plurality of user equipments in at least a cell managed by a base station of the mobile communication network, the method comprising:
    a) receiving a list of all of a plurality of communications to be carried out among the plurality of user equipments within one transmission time interval (TTI);
    b) receiving a first indication about an amount of available communication resources;
    c) obtaining information about interfering communications among the plurality of user equipments based on all communications occurring in at least the cell of the mobile communication network and based on the plurality of communications to be carried out; and
    for all of the plurality of communications among the plurality of user equipments to be performed within the one TTI and to which communication resources have to be allocated:
    d) receiving a second indication about an available communication rate for an infrastructure-based communication and for a device-to-device communication;
    e) receiving a third indication about a requested communication rate for each of the plurality of communications to be performed within the one TTI;
    f) making a selection between an infrastructure-based communication type or a device-to-device communication type based on the first, second and third indications and the information about interfering communications; and
    g) allocating communication resources to all of the plurality of communications to be performed within the one TTI on the basis of the selection between an infrastructure-based communication type or a device-to-device communication type.

2. The method according to claim 1, wherein the steps a), b), c), d), e), and f) are performed with a periodicity (TLS) longer than the TTI at which the step g) is performed.

3. The method according to claim 2, wherein each of the plurality of communications comprises a plurality of data packets and the TTI of the step g) corresponds to a duration of a transmission in the mobile communication network.

4. The method according to claim 1, wherein said obtaining information about interfering communications is based on information on position and power measurements of the plurality of user equipments within at least the cell managed by the base station of the mobile communication network.

5. The method according to claim 4, wherein said obtaining information about interfering communications comprises:
    building a conflict graph based on information on position and power measurements of the plurality of user equipments within at least the cell managed by the base station of the mobile communication network, the conflict graph indicating interference between couples of communicating user equipments.

6. The method according to claim 5, further comprising:
    generating a modified conflict graph by modifying the conflict graph on the basis of said selection between an infrastructure-based communication type or a device-to-device communication type.

7. The method according to claim 6, wherein said allocating communication resources is further based on said modified conflict graph.

8. The method according to claim 1, wherein the first indication and the second indication are based on usage metrics of the communication resources regarding ongoing communications.

9. The method according to claim 8, wherein the first indication and the second indication are further based on information about communication resources actually allocated by the step of allocating communication resources.

10. The method according to claim 1, wherein the mobile communication network further comprises a plurality of cells which are portions of a coverage area of the mobile communication network, and wherein the method is configured for allocating communication resources for communications performed by user equipments within a selected group of cells.

11. The method according to claim 10, further comprising, for adjacent cells of said selected group of cells:
defining an interference region, comprising a portion of each adjacent cell of said group of cells, in which device-to-device communications between user equipments of different cells may experience interferences due to other user equipments within the interference region that perform infrastructure-based communications and vice versa infrastructure-based communications may experience interferences due to device-to-device communications.

12. The method according to claim 11, further comprising:
generating a list of user equipments comprised within the interference region, and
indicating communication resources to be allocated to the user equipments of the list in a non-interfering way within the interference region.

13. The method according to claim 1, wherein the communication system is configured to manage communication types and resource allocation for all user equipments in the communication network.

14. A mobile communication network for managing communication of user equipments, the mobile communication network comprising:
a coverage area divided into a plurality of cells, each cell being provided with a radio communication station for managing communications of user equipments in the cell; and
the communication system configured to perform the method according to claim 1.

15. The mobile communication network according to claim 14, wherein the communication system comprises at least one link selection module configured to make said selection between an infrastructure-based communication type or a device-to-device communication, and at least one scheduler module configured to perform said allocating communication resources to each communication, the at least one link selection module being coupled with the at least one scheduler module to allocate communication resources according to said selection.

16. The mobile communication network according to claim 15, wherein at least one link selection module comprises a link selection module configured to make said selection between an infrastructure-based communication type or a device-to-device communication for communications taking place in a selected group of cells of the mobile communication network, and wherein the at least one scheduler module comprises a plurality of scheduler modules each scheduler module being configured to perform said allocating communication resources to each communication in a respective cell of the mobile communication network.

* * * * *